H. C. WEBER.
MANUFACTURE OF RUBBER HEELS.
APPLICATION FILED SEPT. 8, 1915.
1,172,919.
Patented Feb. 22, 1916.
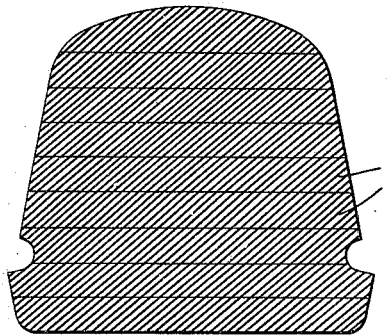
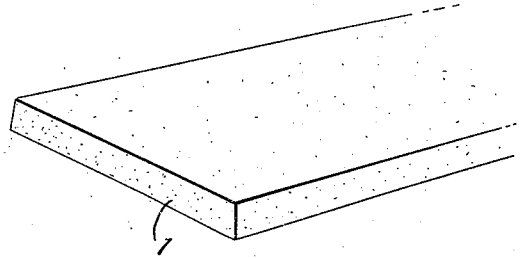
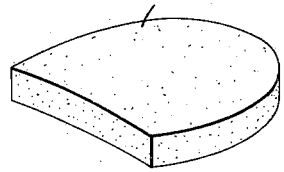
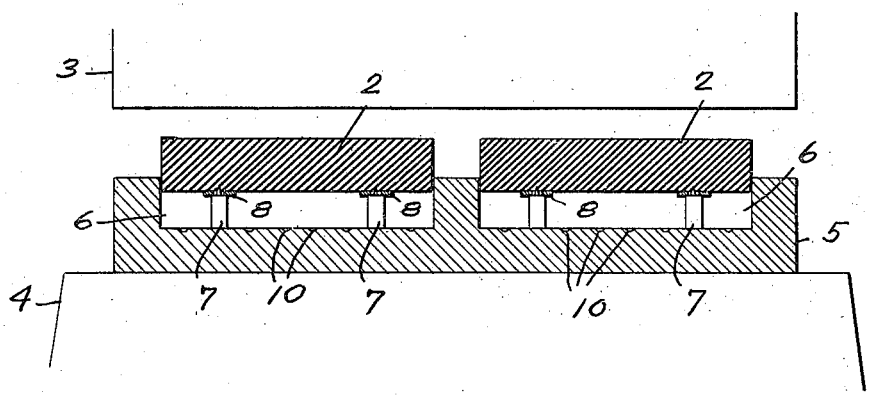
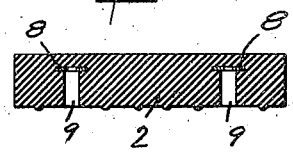

UNITED STATES PATENT OFFICE.

HENRY C. WEBER, OF PORT JEFFERSON, NEW YORK.

MANUFACTURE OF RUBBER HEELS.

1,172,919.  Specification of Letters Patent. Patented Feb. 22, 1916.

Application filed September 8, 1915. Serial No. 49,416.

*To all whom it may concern:*

Be it known that I, HENRY C. WEBER, a native of Germany, having taken out first papers for American citizenship in September, 1913, and a resident of Port Jefferson, Long Island, in the county of Suffolk and State of New York, have invented certain new and useful Improvements in the Manufacture of Rubber Heels, of which the following is a specification.

The object of this invention is to enable one-piece rubber heels of good quality to be made from discarded truck tires, that is to say, from already vulcanized rubber. Ordinarily rubber heels are molded from a plastic composition, and washers placed on pins in the mold are embedded in the material as it flows to fill the cavity, the purpose of these washers, as is well understood, being to receive the pressure of the nail heads by which the finished heel is attached to the shoe. It has been proposed to make heels by cutting up truck tires, but the problem presented itself of inserting the washers and as a solution of this difficulty each heel was made in halves, the washers being placed between, and the halves cemented together. I have discovered however that washers provided they are not too large, say about ¼th inch in diameter, can be forced flatwise into the interior of a one-piece heel blank of already vulcanized material, without breaking the rubber, and that when so positioned they are securely held by the elastic material partly closing in behind them. I have also discovered that the same operation can be utilized to form the nail holes leading to the washers without removal of material, instead of drilling or cutting out the openings by a special operation as heretofore. At the same time, also, the bottom of the heel is finished in relief or intaglio. It is an advantage of my process that it may be carried out with apparatus such as that usually employed for making the molded composition heels, but it will be evident that the processes themselves are quite dissimilar.

In the accompanying drawings: Figure 1 is a view indicating the manner in which the truck tires are sliced; Fig. 2 represents a slice reduced to uniform thickness, that is to say substantially the thickness of the finished heel; Fig. 3 shows a heel blank cut from such a slice; Fig. 4 is a vertical sectional view showing a heel blank with the apparatus for forcing the washers therein and forming the nail holes; and Fig. 5 is a vertical section through a completed heel.

The blanks are provided in the following manner: The truck tires are cut into suitable lengths and the lengths are then sliced approximately as indicated in Fig. 1. These slices 1 are as thick as the completed heels are to be, with an added allowance for the material removed in the next operation, which consists in grinding the surfaces of the slices to obtain a uniform thickness which is substantially the same as that of the finished product. From these slices the blanks 2 are then cut out. It will be understood, therefore, that these blanks consist each of one piece of solid already vulcanized rubber, and are of final shape and size. The top and bottom surfaces are both plain and imperforate.

The apparatus preferably used for performing the remainder of the process is an ordinary form of press having upper and lower members 3 and 4, the latter steam-heated as usual, and a plate 5 which is placed on the lower member of the press and is provided with cavities 6 having substantially the same size and shape as the blanks. Pins 7 rise from the bottoms of these cavities in positions corresponding to the desired positions of the washers and nail holes in the heels, and on shoulders near the tops of these pins are placed the washers 8. The solid heel blanks are placed upon the tops of the pins within the upper portions of the cavities, and pressure is then applied, with the result that the washers and pins are forced into the solid rubber, though without rupturing the latter. The elastic rubber closes in behind the washers sufficiently to lock them in place, but the holes 9 formed by the passage of the washers and pins do not disappear when the pins are withdrawn, and consequently serve as the nail holes which facilitate the driving of the nails by which the heels are affixed to the shoes. Simultaneously with the introduction of the washers into the solid rubber blank and the formation of the nail holes, the bottom surfaces of the blanks are finished with lettering or other projections or recesses corresponding to formations 10 in the bottoms of the cavities.

What I claim as new is:

The method of making rubber heels which comprises cutting solid rubber tires into slices approximating the thickness of the heels to be produced, grinding the faces of the slices to obtain uniform thickness, cutting out full-thickness heel blanks from the slices, and forcing washers flatwise into the interior of the blanks and simultaneously finishing the bottoms thereof and forming the nail holes leading to the washers under heat and pressure.

In witness whereof I have hereunto signed my name.

HENRY C. WEBER.

Witness:
R. B. DAYTON.